US009186739B2

(12) United States Patent
Floeter

(10) Patent No.: US 9,186,739 B2
(45) Date of Patent: Nov. 17, 2015

(54) METHOD FOR CREATING AN INNER THREAD AS WELL AS A COMBINATION OF A THREAD CUTTER AND A BODY HAVING A CUTOUT

(75) Inventor: Felix Floeter, Hannover (DE)

(73) Assignee: Hilti Aktiengesellschaft, Schaan (LI)

( * ) Notice: Subject to any disclaimer, the term of this patent is extended or adjusted under 35 U.S.C. 154(b) by 492 days.

(21) Appl. No.: 13/467,231

(22) Filed: May 9, 2012

(65) Prior Publication Data

US 2012/0289350 A1 Nov. 15, 2012

(30) Foreign Application Priority Data

May 12, 2011 (DE) .......................... 10 2011 075 770

(51) Int. Cl.
  *B23G 1/16* (2006.01)
  *B23G 5/06* (2006.01)
(52) U.S. Cl.
  CPC .. *B23G 1/16* (2013.01); *B23G 5/06* (2013.01); *Y10T 408/9048* (2015.01)
(58) Field of Classification Search
  CPC ............. B23G 1/32; B23G 7/00; B23G 7/02; B23G 2240/36; B23G 2210/04; B23G 2210/48; B23G 1/16; B23G 5/06; Y10T 408/9048
  USPC ......................................... 470/18, 25, 87, 96
  See application file for complete search history.

(56) References Cited

U.S. PATENT DOCUMENTS

| 3,359,581 A | 12/1967 | Senediak |
| 4,449,868 A | 5/1984 | Steinsberger et al. |
| 5,507,694 A | 4/1996 | Thun |
| 6,685,573 B2 * | 2/2004 | Hikosaka et al. ............. 470/204 |
| 2004/0258492 A1 | 12/2004 | Hakansson |
| 2010/0209204 A1 | 8/2010 | Wissling et al. ............... 408/1 R |
| 2010/0260566 A1 * | 10/2010 | Glimpel et al. ............... 408/222 |
| 2010/0329803 A1 | 12/2010 | Strom |

FOREIGN PATENT DOCUMENTS

| CN | 2127645 | 3/1993 |
| CN | 1100679 | 3/1995 |
| CN | 101549422 | 10/2009 |
| CN | 101896306 | 11/2010 |
| DE | 11 76 450 | 5/1964 |
| DE | 10 2005 019 426 | 10/2006 |

(Continued)

*Primary Examiner* — Teresa M Ekiert
(74) *Attorney, Agent, or Firm* — Davidson, Davidson & Kappel, LLC

(57) ABSTRACT

A method for creating an inner thread in an opening of a body, using a thread cutter, including the following steps:

a) the thread cutter having an axial lengthwise cutout adjacent to which there are blades that project radially outwards and that have cutting edges, is inserted into the opening, whereby several cutting edges arranged one after the other in the longitudinal direction are provided on the lengthwise cutout, which are offset with respect to each other in the circumferential direction, and which are pushed into the groove when the thread cutter is being inserted,
  b) the cutting tool is rotated by a maximum of 360° in order to create the entire inner thread in at least one projection next to the groove, whereby the cutting edges penetrate into the projection one after the other as the thread cutter turns, and
  c) the thread cutter is moved axially out of the opening.

10 Claims, 4 Drawing Sheets

(56) References Cited

FOREIGN PATENT DOCUMENTS

| | | |
|---|---|---|
| DE | 102005019426 | 10/2006 |
| DE | 10 2010 054 476 | 6/2012 |
| EP | 2 218 536 A1 | 8/2010 |
| JP | 61136725 | 6/1986 |
| JP | 6179121 | 6/1994 |
| JP | H081426 | 1/1996 |
| JP | 2004522606 | 7/2004 |

* cited by examiner

METHOD FOR CREATING AN INNER THREAD AS WELL AS A COMBINATION OF A THREAD CUTTER AND A BODY HAVING A CUTOUT

This claims the benefit of German Patent Application DE 10 2011 075 770.8 filed May 12, 2011, and hereby incorporated by reference herein.

BACKGROUND

The invention relates to a method for using a thread cutter in order to create an inner thread in an essentially cylindrical opening of a body having a center axis, whereby the cylindrical opening has at least one groove that runs essentially in the longitudinal direction, whose depth is equal to or greater than the outer radius of the thread cutter as measured from the center axis, whereby a projection that extends radially inwards and axially is provided in the body after the groove as seen in the circumferential direction. Moreover, the invention relates to a combination of a thread cutter and a body having a cylindrical opening with at least one groove that runs essentially in the longitudinal direction.

Various production methods are known for purposes of creating an inner thread in the opening of a body, for example, a concrete anchor. Normally, such threads are made using a thread cutter that is screwed into the opening and that cuts the thread during the screwing procedure. In this process, the thread cutter can only cut one thread track for each rotation of the thread cutter, in other words, a thread section that encircles 360°. Consequently, many rotations of the thread cutter are needed in order to create a long thread. By the same token, after the thread has been completed, such a thread-cutting tool then has to be unscrewed from the entire length of the thread.

In order to accelerate this procedure, European patent application EP 2 218 536 A1 discloses a thread cutter that has several radially projecting cutting edges arranged one after the other in the axial direction, whereby the number of cutting edges matches the desired number of thread tracks. The workpiece that is to be processed has an opening with at least one groove that runs in the longitudinal direction and that corresponds to the cutting edges. The thread cutter can be pushed into the opening, during which process the cutting edges of the thread cutter are inserted into the groove.

In order to cut the thread, the thread cutter is subsequently rotated around its longitudinal axis. In this process, starting at the groove, each cutting edge cuts a complete thread track until the cutting edges end up in the groove once again after a rotation by 360°. Subsequently, the thread cutter can be pulled back out of the opening in the axial direction. Therefore, the entire length of the thread is cut with a single rotation of the thread cutter. This makes it possible to create a thread much more quickly. A problematic aspect of this production technique is that it requires a great deal of force in order to cut the thread.

SUMMARY OF THE INVENTION

It is an object of the present invention to reduce the amount of force required for cutting such a thread.

The present invention provides a thread cutter, which has an axial lengthwise cutout adjacent to which in the circumferential direction there are blades that project radially outwards and that have cutting edges, whereby several cutting edges arranged one after the other in the longitudinal direction are provided on the lengthwise cutout, and they are offset with respect to each other in the circumferential direction. When the cutting tool is rotated by a maximum of 360° in order to create the entire inner thread in the projection, the cutting edges penetrate into the projection one after the other as the thread cutter turns. This has the advantage that, at first, only one or a few cutting edges are in contact with the projection and cut their way into it. Only once these cutting edges have cut their way into the projection do additional cutting edges come into contact with the projection and cut their way into it. The force increase as the tool is turned takes place more slowly and more uniformly, so that large force peaks can be avoided, especially at the beginning of the cutting procedure. Since the force needed for a cutting edge to cut into the material is greatest at the beginning of the cutting procedure and since these load peaks caused by the individual cutting edges are distributed, the maximum force needed to cut the thread is considerably less than in the case of a conventional thread cutter.

The cylindrical opening or the cutting tool is preferably configured in such a way that the thread cutter is inserted into the opening in a rectilinear movement, that is to say, no rotational movement is made while the thread cutter is being inserted, so that this procedure is simple and fast. The thread cutter only needs to be aligned at the beginning of the procedure in such a way that the cutting edges can be pushed into the grooves. Subsequently, the thread cutter is completely inserted into the opening with a rectilinear movement, then turned and finally pulled out of the opening, likewise with a rectilinear movement.

As an alternative, the groove of the opening can also run helically in the opening and, when the thread cutter is being inserted, it is turned so as to follow the groove, whereby especially the cutting edges do not come into contact with the opening while they are being inserted. As a result, the interruption of a thread track created by the groove is offset in the circumferential direction, so that the load from a load-transmission means screwed into the body can be more effectively transmitted to the entire circumference of the opening. The offset of the cutting edges in the circumferential direction is selected here in such a manner that their curvature differs from that of the groove, so that here, too, the cutting edges do not simultaneously come into contact with the projection, and they penetrate into the projection one after the other.

The cutting edges can be arranged, for example, in such a way that they are, at least in certain sections, on a straight line, as seen in a side view of the thread cutter. Here, the cutting edges can form, for instance, groups, whereby the cutting edges of each group are on a straight line. The straight lines of the individual groups can be parallel to each other here, so that the cutting edges form a sawtooth pattern, so to speak. In this embodiment, it is likewise conceivable that each first cutting edge of each group penetrates into the projection simultaneously. However, it is likewise conceivable that all of the cutting edges are on a shared straight line, in other words, so that only one cutting edge at a time can penetrate into the projection.

The cutting edges, however, do not necessarily have to be on a straight line. For instance, it is likewise conceivable that the cutting edges form, at least in certain sections, a uniform helix with respect to the longitudinal direction of the opening. The cutting edges can also be on a curve.

The thread cutter can also have several lengthwise cutouts that are offset in the circumferential direction. In such an embodiment, the opening has a corresponding number of projections. This makes it possible to form a complete thread even with less of a rotation. If, for example, two lengthwise cutouts are provided which are situated opposite from each other, a turn of 180° can create a complete thread in the appertaining body that has two grooves corresponding to the lengthwise cutouts. The turning of the cutting tool can be further reduced with a corresponding number of uniformly distributed grooves.

In the circumferential direction, there is preferably some play between the projection and the adjacent lengthwise cutout, amounting at the maximum to twice the axial height of the blades on the thread cutter.

A combination consisting of a body having an opening and a thread cutter is likewise provided according to the invention, whereby the opening of the body has a groove that runs essentially in the longitudinal direction and whose depth, as measured from the center axis, is equal to or greater than the outer radius of the thread cutter. After the groove as seen in the circumferential direction, there is a projection that runs radially and axially. The thread cutter has an axial cutout adjacent to which there are blades with cutting edges which project radially outwards, which are arranged one after the other on the lengthwise cutout in the longitudinal direction, and which are arranged so as to be offset with respect to each other in the circumferential direction. The distance of the cutting edges which are arranged one after the other corresponds to the distance of the desired thread height.

Preferably, the number of cutting edges matches the number of thread flights created, that is to say, the entire thread is cut with one turn of the thread cutter.

In the circumferential direction, there is preferably some play between the projection and the adjacent lengthwise cutout, amounting at the maximum to twice the axial height of the blades on the thread cutter.

BRIEF DESCRIPTION OF THE DRAWINGS

Additional advantages and features can be gleaned from the description below in conjunction with the accompanying drawings. These show the following.

DETAILED DESCRIPTION

Figure 1:
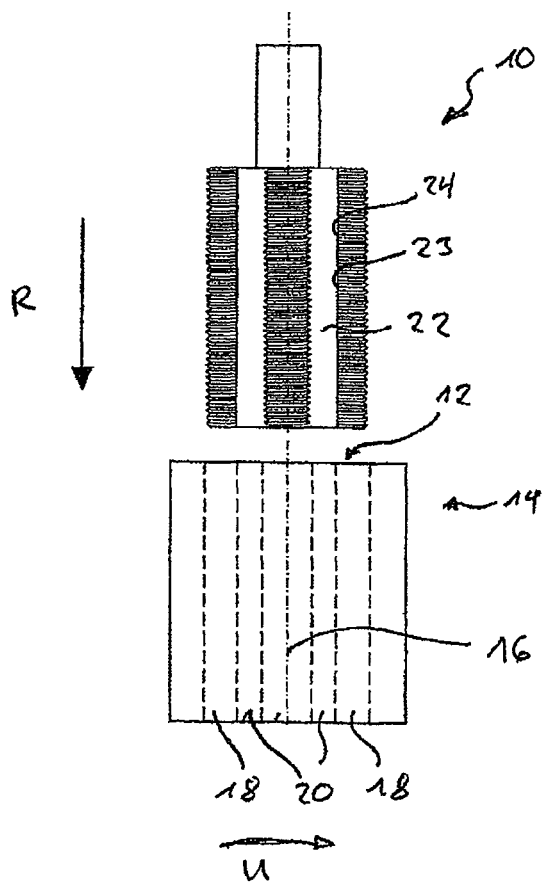
FIG. 1 a thread cutter according to the state of the art, with a body.
Figure 2:
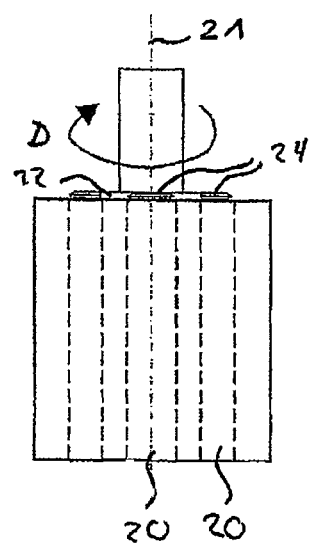
FIG. 2 the thread cutter from FIG. 1, when inserted into the body.
Figure 3:
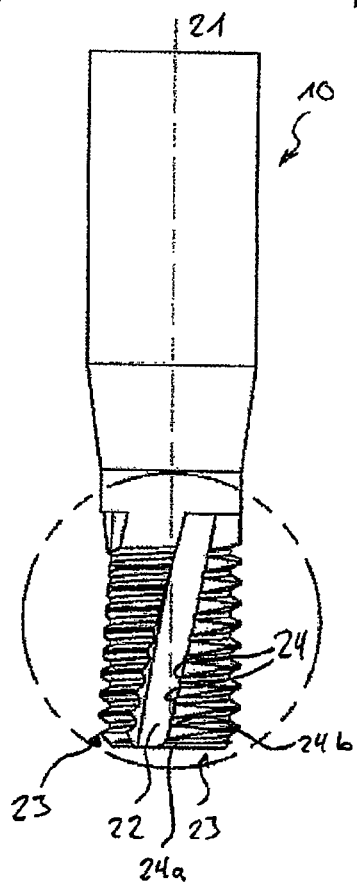
FIG. 3 a side view of a thread cutter, as part of the combination according to the invention.
Figure 4:
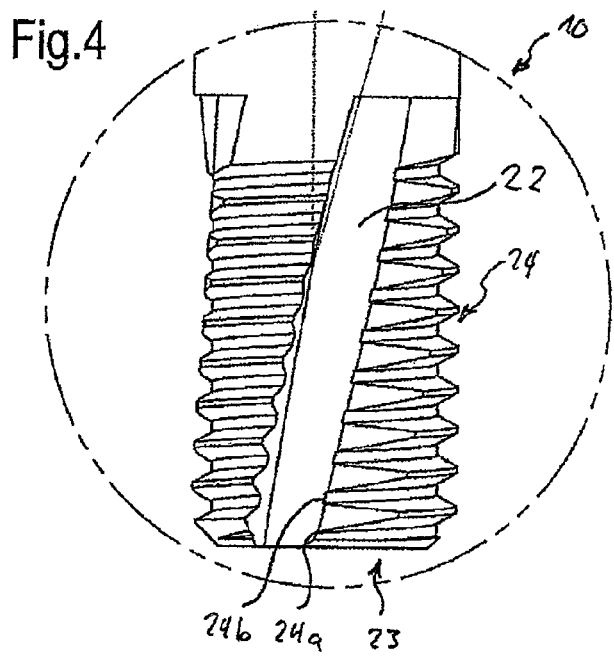
FIG. 4 a detailed view of the thread cutter from FIG. 3.
Figure 5:
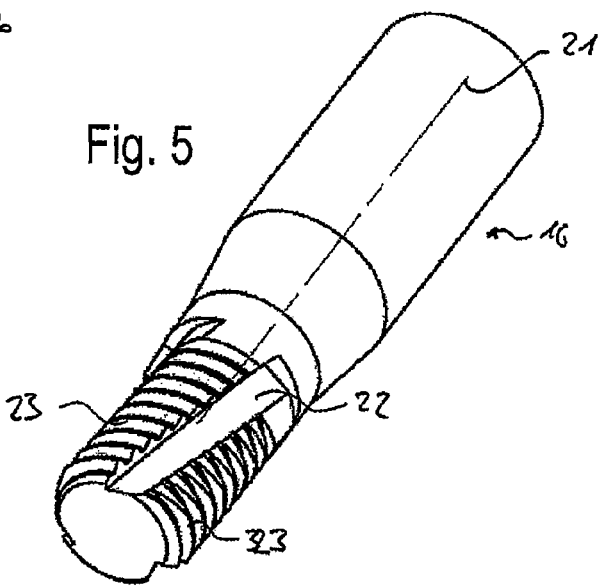
FIG. 5 a perspective view of the thread cutter from FIG. 3.
Figure 6:
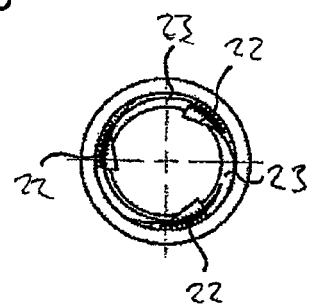
FIG. 6 an axial top view onto the thread cutter from FIG. 3.

FIGS. 1 and 2 show a conventional thread cutter 10 for cutting an inner thread in a hole-like opening 12 of a body 14. The hole-like opening 12 is configured essentially cylindrically and has a center axis 16. Furthermore, the opening 12 has several axially running grooves 18 distributed uniformly along the inner circumference. As seen in the circumferential direction U, a radially inwards as well as axially running projection 20 is provided after each groove.

The depth of the grooves 18 as measured from the center axis 16 is equal to or greater than the outer radius of the desired thread and equal to or greater than the outer radius of the thread cutter 10.

The thread cutter 10 has a longitudinal axis 21 that coincides with the center axis 16 as well as several lengthwise cutouts 22 uniformly distributed along the outer circumference, whereby the number of lengthwise cutouts 22 matches the number of projections 20 of the body 14. In each case, a set of cutting edges 24 is provided between two adjacent lengthwise cutouts 22, whereby several cutting edges 24 arranged one after the other in the longitudinal direction are provided on each lengthwise cutout 22. The number of cutting edges 24 corresponds to the number of desired thread tracks in the body 14.

For purposes of creating the inner thread, the thread cutter 10 is inserted into the opening 12 of the body 14 with a rectilinear movement in an insertion direction R (FIG. 2). Once the thread cutter 10 has been inserted into the opening 12 to the desired depth, the thread cutter 10 is rotated around its longitudinal axis, a process in which the cutting edges 24 cut their way into the adjacent projection 20 in the rotational direction D where they form part of the desired thread. The thread cutter is turned until the cutting edges 24 are in the next groove 18 as seen in the rotational direction D.

With this rotation, each set 23 of cutting edges has cut part of the thread into each projection 20 that follows as seen in the rotational direction D. Since one set 23 of cutting edges is associated with each projection 20, an encircling thread is cut into the entire opening 12.

Since the cutting edges 24 are once again in a groove 18 after the cutting procedure, the thread cutter 10 can be removed from the opening 12 with a linear movement in the direction of the center axis 16.

The number of grooves 18 or projections 20 in the opening can be varied as desired, whereby care should be taken to ensure a uniform distribution in the circumferential direction, so that, after the turning procedure and the creation of the thread, all of the cutting edges 24 are once again in a groove 18 and the thread cutter 10 can be removed from the opening 12. The thread cutter 10 can have a number of cutting edges 24 that is appropriately adapted, whereby the rotational angle between the insertion and the removal of the thread cutter 10 always correspond to the angle between two projections 20. The maximum rotational angle in this cutting procedure with only one groove is 360° in order to create a complete thread in the opening 12.

In the case of the thread cutter 10 shown in FIGS. 1 and 2, the cutting edges 24 of a set 23 of cutting edges are all arranged one after the other as seen in the axial direction. As a result, after a turn in the rotational direction D, the cutting edges 24 all make contact with the adjacent projections simultaneously and cut their way into them. This has the drawback a very high force has to be applied in order to turn the thread cutter 10.

In order to eliminate this drawback, in a thread cutter 10 for the method according to the invention, as shown in a first embodiment in FIGS. 3 to 6, the cutting edges 24 are arranged so as to be offset with respect to each other in the circumferential direction. In the figures, the offset in the circumferential direction is depicted in enlarged form for the sake of clarity.

The lengthwise cutouts 22 of the thread cutter 10 shown here each form a helix that rises in the direction of the longitudinal axis 21 of the thread cutter 10, whereby the cutting edges 24 follow the course of the lengthwise cutout 22. In this embodiment, the projections 20 or the grooves 18 of the opening 12 of the body 14, unlike the prior art, are likewise helical, so that the thread cutter 10 is inserted into the opening 12 while being slighted turned. The pitch of the helix of the grooves 18 or of the projections 20 differs from the pitch of the lengthwise cutout 22 of the cutting tool, so that the cutting edges 24 cannot come into contact with the appertaining projection 20 simultaneously.

Here, after a turn in the rotational direction D, in each case, only a first cutting edge 24a of a set 23 of cutting edges is in contact with the appertaining projection 20 at the beginning of the turning procedure. Only when the thread cutter 10 is turned further in the rotational direction D and the cutting edge 24a has penetrated into the projection can the next cutting edge 24b of this set 23 of cutting edges come into contact with the projection 20 and penetrate into it when it is turned further.

Consequently, considerably less force is needed in order to turn the thread cutter 10. In particular, the force increases more slowly at the beginning of the turning procedure since the cutting edges only come into contact with the component one after the other, as a result of which the force needed to turn the thread cutter 10 rises slowly.

In a manner differing from the embodiment shown here, the lengthwise cutout 22 of the thread cutter 10 could also run in such a way that the thread cutter 10 can be inserted in a straight line into the opening without any rotational movement. In this case, the angle formed by the lengthwise cutout with the center axis 16 of the thread cutter 10 would be considerable smaller. All that is necessary is for the cutting edges 24 to be arranged offset in the circumferential direction, so that they do not come into contact with each adjacent projection 20 simultaneously, but rather, so that they cut their way into it one after the other.

Figure 7:
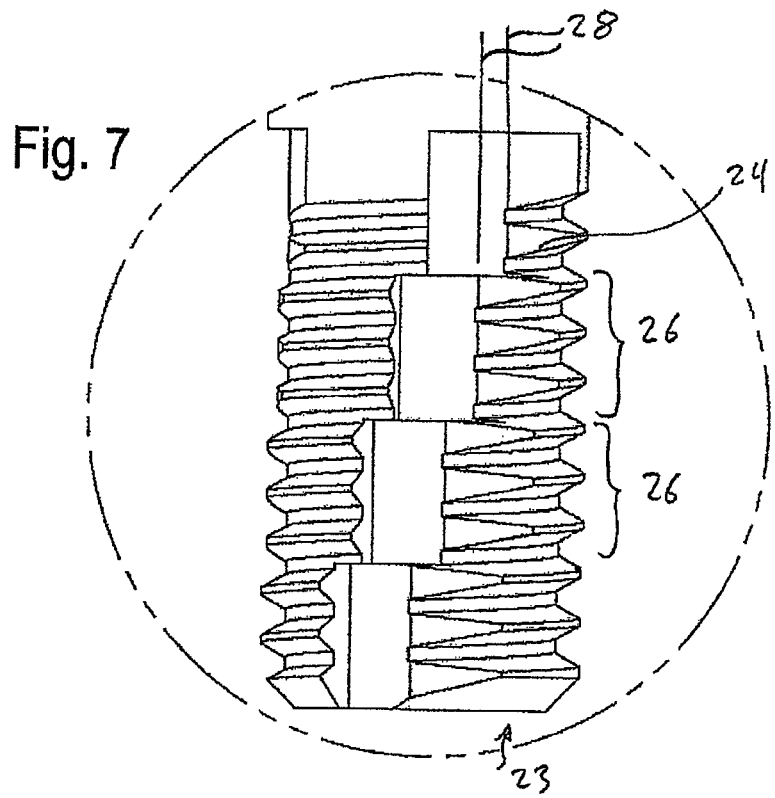
FIG. 7 a detailed view of a second embodiment of a thread cutter employed for the invention.

Instead of the embodiment shown in FIGS. 3 to 6, the lengthwise cutout can also have steps, whereby individual groups 26 of cutting edges 24 are combined into a set 23 of cutting edges and each lie on a straight line 28. In the embodiment shown in FIG. 7, the steps of the lengthwise cutout 22 are configured in such a way that the individual cutting edges 24 of a group 26 are each arranged on a straight line 28 running in the longitudinal direction of the thread cutter 10, whereby the straight lines 28 run parallel to each other.

Figure 8:
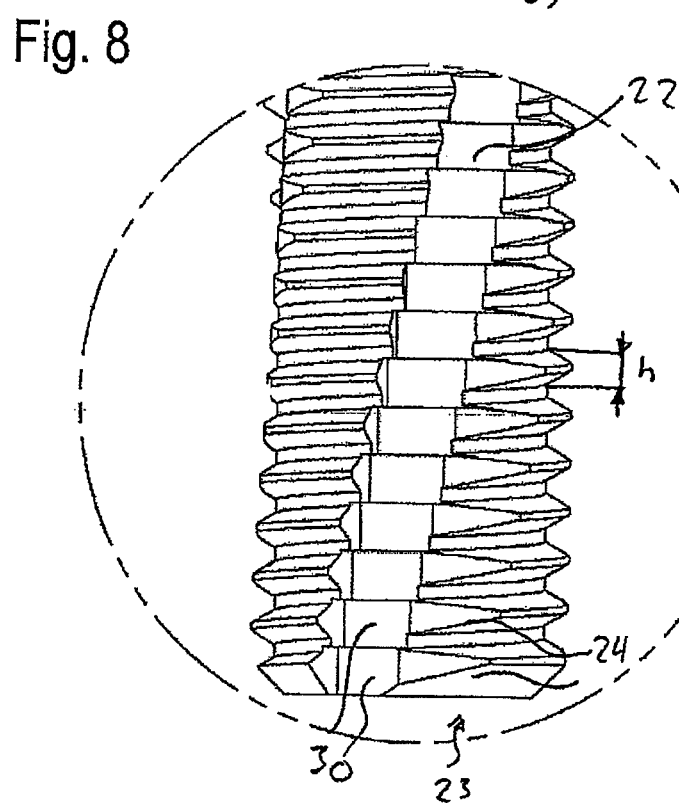
FIG. 8 a third embodiment of a thread cutter employed for the invention.

In the embodiment shown in FIG. 8, the lengthwise cutout 22 has steps, whereby a cutting edge 24 is arranged on each step 30.

Figure 9:
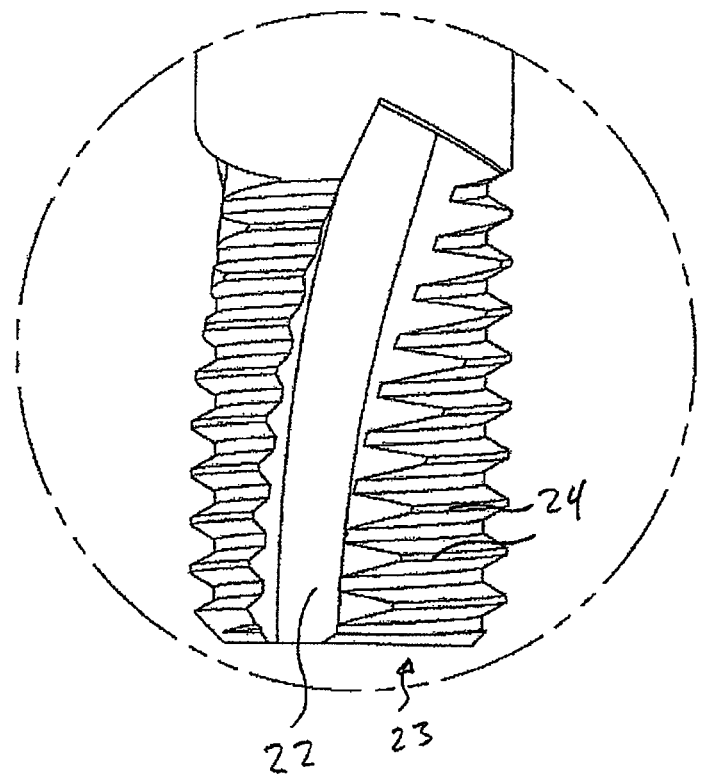
FIG. 9 a fourth embodiment of a thread cutter employed for the invention.

In the embodiment of a thread cutter 10 shown in FIG. 9, the lengthwise cutout 22 has a non-linear course, whereby the curvature of the lengthwise cutout 22 increases opposite to the insertion direction R.

Figure 10:
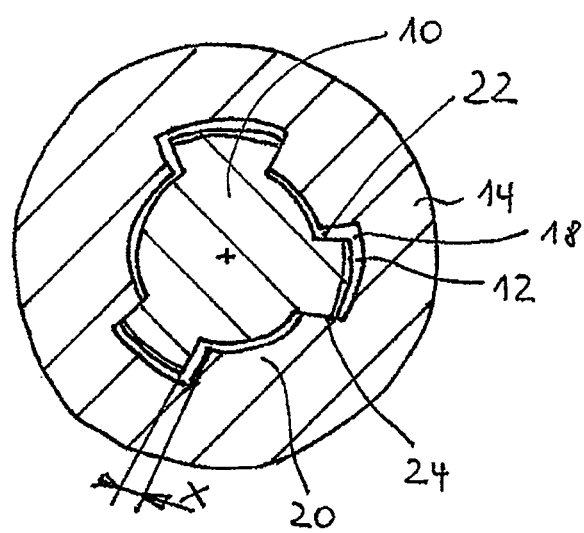
FIG. 10 a sectional view through a body and through a thread cutter according to the invention.

FIG. 10 shows a sectional view through a combination according to the invention, whereby the grooves 18, the projections 20 and the cutting edges 24 can be seen more easily here. A maximum play X is provided between the projection 20 and the lengthwise cutout 22, amounting at the maximum to twice the axial height h of the blades. This has proven to be advantageous for the machining opening.

What is claimed is:

1. A method for creating an inner thread in a cylindrical opening of a body having a center axis, using a thread cutter, the cylindrical opening having at least one groove running in a longitudinal direction, a depth of the groove being is equal to or greater than the outer radius of the thread cutter as measured from the center axis, a projection extending radially inwards and axially being provided in the body next to the groove in a circumferential direction, the method comprising the following steps:
   inserting the thread cutter into the opening, the thread cutter having a plurality of axial lengthwise cutouts evenly spaced on an outer circumference of the thread cutter and a respective set of blades being arranged between each of two neighboring lengthwise cutouts of the plurality of lengthwise cutouts, the blades projecting radially outwards and having cutting edges, several cutting edges of one set of the respective sets of blades arranged one after the other in the longitudinal direction being provided on the lengthwise cutout offset with respect to each other in the circumferential direction, the cutting edges being pushed into the groove when the thread cutter is inserted;
   rotating the cutting tool by a maximum of 360° in order to create an entire inner thread in the projection, the cutting edges penetrating into the projection one after the other as the thread cutter turns; and
   axially moving the thread cutter out of the opening.

2. The method as recited in claim 1 wherein the thread cutter is inserted into the opening during the inserting step in a linear manner.

3. The method as recited in claim 1 wherein the groove runs helically in the opening and, when the thread cutter is being inserted, the thread cutter is turned so as to follow the groove.

4. The method as recited in claim 3 wherein the cutting edges do not come into contact with the opening while being inserted.

5. The method as recited in claim 1 wherein the cutting edges are arranged, at least in certain sections, on a straight line, as seen in a side view of the thread cutter.

6. The method as recited in claim 1 wherein the cutting edges form, at least in certain sections, a uniform helix with respect to the longitudinal direction of the opening.

7. The method as recited in claim 1 wherein the thread cutter has at least one additional lengthwise cutout offset in the circumferential direction from the cutout, and the opening has several corresponding projections.

8. The method as recited in claim 1 wherein, in the circumferential direction, play exists between the projection and an adjacent lengthwise cutout, the play amounting at a maximum to twice the axial height of the blades on the thread cutter.

9. The method as recited in claim 1 wherein the lengthwise cutout has steps.

10. The method as recited in claim 9 wherein one of the cutting edges is arranged on each of the steps.

* * * * *